United States Patent [19]
Maus et al.

[11] Patent Number: 5,376,317
[45] Date of Patent: Dec. 27, 1994

[54] PRECISION SURFACE-REPLICATING THERMOPLASTIC INJECTION MOLDING METHOD AND APPARATUS, USING A HEATING PHASE AND A COOLING PHASE IN EACH MOLDING CYCLE

[75] Inventors: Steven M. Maus, Osseo; George J. Galic, Columbia Heights, both of Minn.

[73] Assignee: Galic Maus Ventures, Columbia Heights, Minn.

[21] Appl. No.: 986,953

[22] Filed: Dec. 8, 1992

[51] Int. Cl.$^5$ .............................. B29C 45/73
[52] U.S. Cl. .................... 264/40.6; 264/1.9; 264/328.16; 249/116; 249/135; 425/144; 425/162; 425/548; 425/552
[58] Field of Search .............. 264/40.1, 40.6, 328.7, 264/328.16, 1.1, 1.3, 1.9, 219; 425/143, 144, 162, 548, 552; 249/116, 134, 135

[56] References Cited

U.S. PATENT DOCUMENTS

| | | |
|---|---|---|
| 4,338,068 | 7/1982 | Suh . |
| 4,340,551 | 7/1982 | Wada . |
| 4,354,812 | 10/1982 | Wieder . |
| 4,390,485 | 6/1983 | Yang . |
| 4,390,486 | 6/1983 | Hendry . |
| 4,420,446 | 12/1983 | Wieder . |
| 4,496,131 | 1/1985 | Yang ............................ 264/328.16 |
| 4,548,773 | 10/1985 | Suh . |
| 4,623,497 | 11/1986 | Waters . |
| 4,731,013 | 3/1988 | Schrammel . |
| 4,902,454 | 2/1990 | Steinbiechler . |
| 4,963,312 | 10/1990 | Muller . |
| 5,015,426 | 5/1991 | Maus et al. ...................... 264/328.7 |
| 5,055,025 | 10/1991 | Muller . |
| 5,061,415 | 10/1991 | Depcik . |
| 5,062,786 | 11/1991 | Arai . |
| 5,064,597 | 11/1991 | Kim ............................ 264/DIG. 46 |
| 5,075,051 | 12/1991 | Ho et al. . |
| 5,093,049 | 3/1992 | Uehara et al. . |
| 5,108,689 | 4/1992 | Uehara et al. . |

FOREIGN PATENT DOCUMENTS 58-215309 12/1983 Japan .............................. 264/40.1

OTHER PUBLICATIONS

Modern Plastics Magazine tech article, p. 21 of Jun. 1992 issue & Asahi tech literature on this.

*Primary Examiner*—Mathieu D. Vargot

[57] ABSTRACT

Improved optical disks for information storage and holographic imaging, and optical lenses and reflective optical elements are among the difficult-to-mold thermoplastic products which require precision replication of the molding surfaces, in micro detail. By heating (with circulating heat transfer fluids supplied by a hot side reservoir) these mold surfaces to a temperature setpoint sufficiently high to retard solidification and premature viscoelastic skinning of the molten thermoplastic injected into the mold cavity, superior quality molded surfaces can be formed by the plastic, which is then rapidly cooled to solidification (by circulating heat transfer fluids supplied from a cold side reservoir). Each injection molding cycle thus starts with a heating phase, wherein molding surface temperature increase is thermally driven by hot side reservoir fluid temperatures above the melt-solidifying temperatures (Tg or Tm) characteristic to the thermoplastic, followed by a cooling phase, wherein molding surface temperature decrease is thermally driven by cold side reservoir fluid temperatures below the melt-solidifying temperatures (Tg or Tm) characteristic to the thermoplastic. The greater these temperature differences are, the faster the molding cycle will be. Fluid control units and electronic process sequence control units are interconnected to govern the flow of these fluids into and out of the injection mold and the reservoirs in accordance with the predetermined logic of the process flowsheet.

17 Claims, 4 Drawing Sheets

PRECISION SURFACE-REPLICATING THERMOPLASTIC INJECTION MOLDING METHOD AND APPARATUS, USING A HEATING PHASE AND A COOLING PHASE IN EACH MOLDING CYCLE

FIELD OF THE INVENTION

The present invention relates to an improved method and apparatus for injection molding thermoplastics with better surface replication and precision, by starting each molding cycle with mold surfaces heated to retard melt solidification before starting injection, then cooling after the mold is filled to solidify the thermoplastic before opening the mold.

BACKGROUND OF THE INVENTION

The concept of initially injecting molten thermoplastic into a mold cavity having surface temperatures greater than the glass transition temperature (Tg)—for an amorphous thermoplastic polymer—or above the melting temperatures (Tm) for a—crystalline thermoplastic polymer—is not by itself novel, but methods for practical and commercial use are believed to be scarce. No known commercial use has been made specifically for optically transparent thermoplastics injection molded into optical disks for information storage and holographic imaging, and/or optical lenses and reflective optical elements. Yang (U.S. Pat. No. 4,390,485 issued Jun. 28, 1983) teaches to "quickly heat a mold cavity surface . . . just prior to the injection of a foamable plastic resin" . . . using thin metal surface sheets heated by electrical resistance at low voltage in an otherwise conventional mold and molding sequence.

Hendry (U.S. Pat. No. 4,390,486 issued Jun. 28, 1983 is another approach to preheating mold cavity surfaces in order to create a resin-rich smooth surfaced foam molding process. Hendry uses a condensing vapor, such as steam, introduced into the mold before injection starts, in order to warm the surfaces, then tries to remove the condensing vapor before injection starts. Obviously, any residual condensate acts as an impurity at the molded surface, which would quickly produce a cosmetic flaw or even worse, in the case where a water-sensitive plastic such as polycarbonate, PET, or nylon would be brought in contact with any residual moisture, which would then cause instantaneously the well-known "silver streak" type of cosmetic flaws.

These prior art references seek to warm substantially all the part forming surfaces of the mold cavity to the extent possible, without special regard to localized heating or cooling of certain portions of the mold cavity.

Depcik (U.S. Pat. No. 5,061,415 issued Oct. 29, 1991) teaches use of localized heating of only a portion of the mold cavity by means of high frequency electromagnetic field and application of pressure in the critical region in order to prevent what he called "sunk spots" (which are believed to be what is commonly called "sink marks").

A more substantial technical disclosure, using different apparatus and approaches, is taken by Suh (U.S. Pat. No. 4,338,068 issued Jul. 6, 1982 and U.S. Pat. No. 4,548,773 issued Oct. 22, 1985). Suh recognizes that, for reproducible precise dimensions of the molded part, uniform shrinkage of the molded plastic is essential. Therefore, in a typical thermoplastic molding of cross-sectionally non-uniform wall thickness, there will inevitably be non-uniform shrinkages unless these localized regions of the mold have differential heat transfer capabilities. Suh provides this capability of localized differential thermal conductence by means of heat pipes installed at those stragegic points. Suh also teaches use of a thin mold face which can be electrically heated by means of incorporating electrical resistence wires within an electroform.

Wada (U.S. Pat. No. 4,340,551 issued Jul. 20, 1982) seeks to heat only the mold cavity surfaces, to the extent possible, to a temperature above the heat distortion of the thermoplastic resin composition, in order to again create a resin-rich layer when molding a filled or fiberglass reinforced thermoplastic. Wada uses electrical induction heating, supplied by means of a double-faced removable block (heated inductively from within) having on each of the 2 faces side a mating contour which can mate with the contour of the opposing inner facing mold cavity surfaces. This block can be moved in and out of the mold from within the parting line on each molding cycle.

Specifically, when the previous molding cycle ends and the mold opens to discharge the molded plastic part, then Wada inserts this mating contoured block into the open mold then closes the mold to warm the opposing inner facing mold cavity surfaces at a very high heating rate (degrees per second). Then after the desired mold surface temperature has been reached, the molding machine again retracts its movable platen to open the mold and withdraw the induction heating block out of the mold cavity and again close the mold at the parting line and then inject into the enclosed preheated mold the reinforced thermoplastic. The mold cavity surface temperatures being above the solidification temperatures of the plastic melt prevents surface layers of the injected melt from prematurely "skinning" or "setting up", thus providing for a much higher gloss surface than would ordinarily be the case with a random-filled mix of plastic resin and fiberglass or filler. Wada also claims benefit in reducing the weld lines formed when opposing meltfronts are joined at . . . "a conflux line in a form of thin groove having a depth of 3-5 micron or more and a width of over 10 micron". Cosmetic flaws such as flow marks, silver streak, and jetting are claimed to be eliminated by Wada's invention. Wada's alternative embodiment is to incorporate the induction heating element (B and B' as shown in FIG. 4) directly behind the mold cavity element which forms the outward facing surface on either side of the parting line. C and C' are insulation layers made from non-magnetic metals such as the alloys of copper and aluminum, which are not responsive to high frequency induction heating, in order to thereby minimize dissipation of this energy into the mold as a whole. Importantly, whereas these metals are "dead" with respect to energy flux of induction heating, they would be of course among the highest thermally conductive metals and are therefore the exact opposite of isolating the rest of the mold from thermal conduction.

Cooling means for circulating coolant within Wada molds are not shown in any of the drawings, but are implied in the text, and in example 1 Wada states that during induction heatup phase of the molding cycle, circulation of the coolant is stopped.

A more substantial limitation of Wada's preferred embodiment, however, is that the heating efficiency is directly proportional to the surface area of contact between the induction heating element (inserted at the open parting line, then clamped together between the mold halves) and the opposing mold cavity faces that are to be heated up before injection starts. These opposing mold cavity faces are, in turn, inevitably scratched and marred by this contact. The greater the clamping force applied (to bring the surfaces into intimate contact), the worse the surface damage. Any slight misalignment of the A and B moldhalves (i.e. not exactly co-axial) will aggrevate this damage, if the cavities are contoured (as would be the case with optical lenses). It is believed that is why Wada is apparently being used only for opaque (non-optical) moldings, and especially suited for textured moldings and glass-fiber-filled plastics. See enclosed Asahi publications and June 1992 *Modern Plastics Magazine* article (p.21). There is no support for any belief that Wada has been used successfully within the relevant field of optically transparent thermoplastics injection molded into optical disks for information storage and holographic imaging, and/or optical lenses and reflective optical elements.

Other prior art doesn't teach prewarming the mold surface above solidification temperatures of the plastic but may have relevant elements.

Waters (U.S. Pat. No. 4,623,497 issued Nov. 18, 1986) provides a passive mold cooling and heating method which locates a heating OR a cooling fluid which is capable of phase change into vapor and out of vapor by subsequent condensation. This fluid reservoir is located below the height of the mold within which circulation is to take place, so that during heat up phase, the fluid is turned into vapor and rises throughout the channels provided in the mold. Then, after condensing, the vapor returns by gravity. However, Waters' main advantage appears to be that it is a passive system, not requiring large volumes of pumped liquids in circulation to achieve its result. Nowhere does Waters teach an advantage to preheat the mold surfaces above a solidification or heat distortion temperature of the plastic, then change to cooling conditions for rapid heat removal within the same injection molding cycle. In fact, Waters is intended to be used in many forms of thermoplastic and thermoset molding, including injection molding, blow molding, rotational molding, compression molding, reaction injection molding, etc. The latter two are predominantly employed with a thermoset, crosslinkable plastics, and in those cases, the purpose of circulating heat transfer fluid is to heat the mold, not to dissipate the heat of injected molten thermoplastic. In other words, Waters does not teach alternating within the same molding cycle a heating phase and a cooling phase; he concentrates rather on the simplification of the fluid heat transfer media conveyance system.

Steinbiechler (U.S. Pat. No. 4,902,454 issued Feb. 20, 1990) provided for a intermittent actuation of certain valving, preferably in response to temperature sensors mounted within the connecting lines for which circulating coolant flows into and out of a mold temperature controlling unit on its way into and out of the molds. Preferred embodiment also employs an additional temperature sensor mounted within the mold itself.

The purpose of this invention appears to be to optimize the uniformity of mold thermal control within a tolerance band during "steady state" production injection molding of thermoplastics. That is, once startup phases are ended, and production operations are implemented, the objective is to minimize mold temperature excursions by means of opening and closing the valve sets under a computer controlled sequence. It is not the intention of Steinbiechler to warm the mold surfaces above solidification temperatures before injection and subsequently to convert to a cooling phase until solidification of the filled plastic is achieved.

Wieder (U.S. Pat. No. 4,354,812 issued Oct. 19, 1982, and U.S. Pat. No. 4,420,446 issued Dec. 13, 1983) teaches method and apparatus for automatic control of a fluid cooled plastic injection mold, to provide fastest possible cycle times by intermittent opening and closing a valve which imparts a burst of cooling fluid at a temperature substantially below the tolerance band width. However, such flow is not continuous, it is instead a series of pulsed bursts of fluid discontinuously injected into the coolant lines as directed by the computer control in response to a temperature sensing probe mounted within the mold. In this way, Wieder minimizes excursions by the mold outside of the tolerance band of the desired mold temperature setpoint. The burst of cold (substantially below the desired mold temperature setpoint) fluid is injected only after the temperature sensor sensed that the mold is now filled with hot molten plastic. Wieder does not teach preheating the mold on each cycle to a temperature above solidification temperatures of the plastic nor that any benefit would be achieved thereby. Schrammel (U.S. Pat. No. 4,731,013, issued Mar. 15, 1988) teaches thermoplastic injection molding of optical data storage disks with optically polished mold cavity surfaces which form the disk, and these mold cavity inserts are made from non-metallic materials such as zirconium oxide or silizium nitride ceramics. This reference is relevant to optical disk molding, but it only briefly mentions thermodynamic aspects of the molding (column 4, lines 10–15), and its choice of a ceramic material in place of a conventional tool steels for the mold cavity construction reduces—rather than improves—the heat transfer rate and thus would be poorly suited for use in an injection molding process wherein mold surface temperature must flucuate greatly from initial temperature above Tg to a lower temperature for solidification of the molten plastic.

SUMMARY OF INVENTION

The present invention overcomes the problems of poor mold surface replication by the molded thermoplastic article and, more specifically, to be able to maximize microreplication of the finest surface detail and contour onto an optical-grade thermoplastic molded product such as optical lenses, information bearing optical disks, holographic disks of reflective and/or transmissive optics, precision molded plastic mirrors and/or refractive optical elements with a light bending function.

Such fidelity of the molded part to the molding surface is achieved by means of heating the mold cavity part forming surfaces at least above a characteristic solid-liquid phase-change temperature which is characteristic of the thermoplastic polymer. Since the most desirable of optically-clear thermoplastic polymers are amorphous in nature (especially, polycarbonate and acrylic), the preferred setpoint could be the glass transition temperature (Tg). For crystalline thermoplastic polymers, another melt-state temperature would be its melting point (Tm). For either type of polymer, the preferred setpoint temperature would be sufficiently high so that the thermoplastic being molded is not form stable at any higher temperatures, then after the mold cavity has at least been completely filled by the molten thermoplastic and before the mold is opened at the parting line, mold surface temperature is dropped to below the Tg or Tm of that thermoplastic material. Reduction of "knitlines" and "weld lines" is another benefit.

Preferably, the mold surface temperature is maintained above Tg or Tm until the mold cavity is not only filled with melt but is sufficiently pressurized to reach a peak value for melt pressure as measured within the mold cavity. This preferred embodiment retards solidification of the plastic onto the mold surfaces at least until the maximum packing pressures withing the cavity has been attained, thereby forcing a still-mobile polymer molecule against the micro detail of the partforming surfaces of the mold cavity construction. Retarded solidification during mold cavity filling also minimizes the well-known problem of high melt pressure near the gate and much lower melt pressure near the end-of-fill cavity wall; this "hydraulic melt pressure drop" incurred during conventional injection filling causes a corresponding difference in volumetric % shrinkage and resulting mechanical inaccuracies and warpages. The preferred embodiment is especially important in achieving high information carrying capacity and accuracies in optical disks and holographics disks, as well as optical lenses and other optical devices.

The present invention preferably employs two greatly different temperature streams of high heat transfer fluids, with one temperature being very hot relative to the desired setpoint for the molding surface temperature in the mold, and the other stream being very substantially much cooler than the desired setpoint of the mold surface temperature after it has been completely filled and packed by the molten thermoplastic. Typically, such a temperature differential is at least 20 degrees C. (38 degrees F.) but is much more advantageously 50–75 degrees C., in order to provide maximum "thermo driving force" to achieve maximal heat transfer rates.

The present invention employs within each molding cycle a heating phase and a cooling phase when viewed from the perspective of the mold cavity surface. By the time the plastic melt first enters the molding cavity, the mold surfaces are warmed to minimize viscoelastic skinning as the thermoplastic meltfront flows from the gate outward. Then, after the mold cavity has been filled and packed with the molten thermoplastic, the molding surface temperature is deliberately reduced to maximize rate of heat removal out of the plastic, so as to cause rapid solidification and thereby minimize total molding cycle time. This is brought about after a predetermined time (typically, measured from start of "mold closed", as sensed by limit switch 12 of FIG. 1) expires, causing a transfer from a "heating phase" to a "cooling phase" within each individual molding cycle.

From the plastic's perspective it sees only the mold surface temperature; however, in operating the molding hardware to perform the present invention, one must take into consideration the existence of time delay between changes made to the apparatus and/or heat transfer media, before actual mold surface temperature changes occur. Therefore, a process sequence chart of mold surface temperature changes will inevitably lag at least a bit from the actual changes made which provide the driving forces for changes in the mold surface temperature. Larger thermodynamic driving forces reduce this delay time and minimize total molding cycle time when maximum temperature differentials exist between the heat transfer media and the mold surface temperature. Therefore, the present invention deliberately maintains a high temperature differential ("Delta T") as a means of speeding response time and converting changes made by the molding apparatus into changes perceived by the plastic (by means of changes induced in the molding surface temperatures, accordingly).

In order to start the molding cycle at an optimally hot mold surface temperature and subsequently to drop rapidly that mold surface temperature to quicken solidification after a predetermined point in the molding cycle is reached, and thereby to minimize total molding cycle time while also maximizing molding productivity and output quality, the present invention necessarily must consider mold materials construction which have relatively good thermal conductivity and heat transfer coefficients, as well as thermal diffusivity (i.e., to minimize point-to-point temperature non-uniformities within the molding surface). Certain tool steels, for example, are substantially better in heat transfer than others; high alloy content steels such as stainless steels would NOT be preferred. For example, substituting a low alloy steel such as H13 or P20 in place of a high alloy stainless steel such as 420 grade provides some improvement; polishability and tarnish resistance of such non stainless steels can be enhanced by means of electroplated nickel or chromium coatings.

However, even higher productivity is achieved in a preferred embodiment using copper based alloys such as copper bronze (Ampcoloy 940 TM from Ampco) and beryllium copper alloys (Moldmax TM or Protherm TM alloys from Brush Wellman), or hardened aluminum alloys. Most preferred optical mold construction would be of the type disclosed and claimed in applicants U.S. Pat. No. 4,793,953 issued Dec. 27, 1988, incorporated herein by reference. These preferred molds for optical thermoplastic high pressure molding combine the high surface polishability and mechanical damage resistance of electroplated nickel or chromium at the outward face of the mold cavity insert with a high conductivity substrate metal such as low alloy beryllium copper (typically 2% or less of beryllium, and 98% of more copper) or similar copper alloys, although conceivably other well known high conductivity metals such as aluminum alloys. (Similarly, precious metals such as silver and gold could conceivably be functional equivalents but too soft and too expensive). By joining the desired surface qualities of the plating with the desired mechanical (typically, a compressive yield strength of at least 50,000 psi is required for satisfactory injection mold cavity inserts, and 80,000–100,000 psi is preferred) and thermodynamic properties of the substrate, a resulting monolithic mold insert well suited for operating the present invention process sequence is obtained.

All the above apparatus can also be employed in an alternative process embodiment, of a "forced cooling" process, wherein the changing mold cavity surface temperature NEVER is allowed to reach the Tg or Tm of the plastic, yet varies greatly as a function of changing molding process sequence. This is described in more detail later herein.

DETAILED DESCRIPTION OF THE INVENTION

Figure 1:
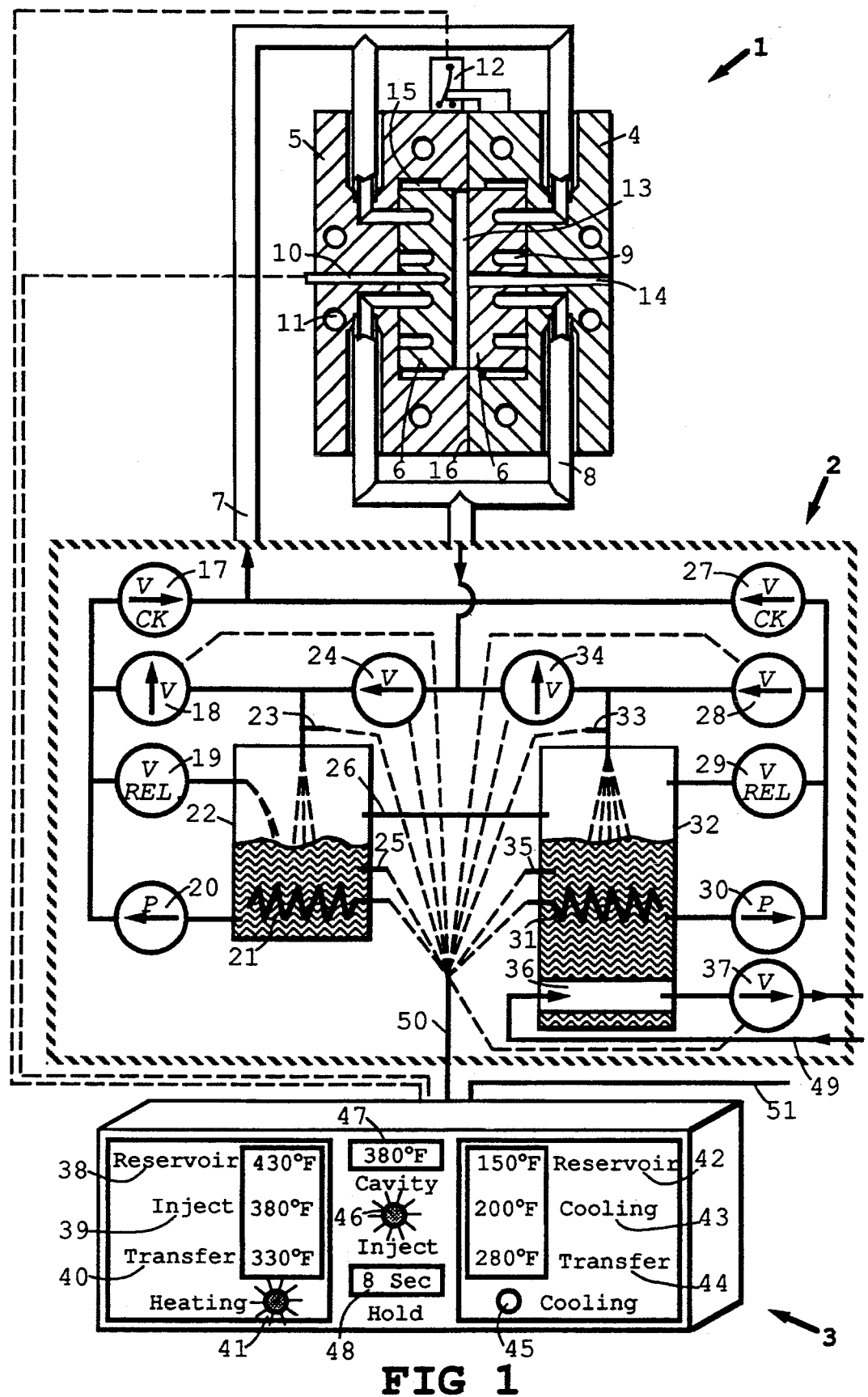
FIG. 1 shows in cross-sectional view an injection mold, with heat transfer fluid plumbing and electronic control circuitry shown in schematic form, connected to a process controller device.

Refer to FIG. 1. The injection mold (1) is shown in cross-section view. On each injection molding cycle, the mold is opened and closed along a parting line (16) by an injection molding machine (not shown). A mold cavity (13) is formed between mold cavity inserts (6) on either side of the parting line (16) when the mold is in a closed position. These mold cavity inserts are, in the case of optical lenses and/or disks, typically highly lapped and polished surfaces or, alternatively, at least one of the molding surfaces may be fitted with a thin nickel electroform which then acts as a partforming surface onto which the molded plastic will replicate itself. Such nickel electroform "stampers" (not shown; typically they are only 0.012" thick (0.3 mm)) are typically employed in optical disk molds, which may thereby contain a changeable information content, directory and formatting information, or other precision surface detail such as would be the case with a holographic array.

As previously mentioned, the materials of construction of the mold cavity insert (6) are of sufficient mechanical load bearing and desirably of very high thermal conductivity to be suitable for rapid thermodynamic change, which is necessary if a minimal molding total cycle time is to be attained. As previously mentioned, copper based high strength mold alloy materials are preferred, and a most preferred embodiment would be use of Applicants' U.S. Pat. No. 4,793,953 herein incorporated by reference, or functional equivalence thereof. The mold cavity insert is preferably fitted directly with heat transfer fluid circulating channels, but within a single monolithic piece of high conductivity metal. However, a less preferred embodiment would place a high conductivity mold element into an assembly joined mechanically or adhesively to a backing plate wherein the channels for circulating heat transfer fluid could be housed.

The mold cavity inserts are mechanically supported and housed within a stationary moldhalf (4) and a moveable moldhalf (5). Note that for optimum results it is desired to create dead air space, to the extent possible without giving poor mechanical rigidity/support to the mold assembly, between the mold cavity insert (6) and its supporting mold half (4, 5) by means of thermal isolation "dead air pockets" (15) to create a desired "thermopane" effect to as much of the total surface area at the juncture of mold cavity insert (6) and the supporting mold structure mold half (4, 5).

It is important to note that whereas insert heat transfer fluid circulation channels (9) are alternately filled with relatively hotter and relatively colder heat transfer fluids within each individual molding cycle, the supporting moldhalf is fitted with flow channels (11) through which heat transfer fluid may also flow, but that these moldhalf flow channels are supplied by an independent source (not shown) of heat transfer fluid maintained, to the extent possible, at a constant temperature throughout the whole molding cycle. This constant temperature is characteristically less than the heat transfer fluid temperature flowing in insert channel (9) at the "heating phase" (at the start of each individual molding cycle), but that the fluid temperature in moldhalf flow channel (11) will be greater than the heat transfer fluid temperature within molding cavity insert flow channel (9) after the process control unit (3) has transferred from the "heating phase" to a "cooling phase". An alternate but less preferred embodiment not shown in FIG. 1 has NOT located the heat transfer fluid circulation channels within the opposing mold cavity inserts (6), but rather within one or more support plates having a mating-contoured-surface onto which opposing mold cavity inserts (6) can be removably mounted (for easier changeover), whereby intimate thermal contact is maintained therebetween. Such alternate but less preferred embodiment will generally have slower heat transfer and poorer thermal diffusivity, of course.

Look now at the fluid control unit (2), showing a schematic diagram of the heat transfer fluid supply system which feeds into supply line (7) to the injection mold (1) and out of injection mold (1) by fluid return line (8). Supply line (7) is shown feeding into both mold halves and both cavity inserts (6), but it would be obvious to provide at least 2 such fluid control unit (2) so that each moldhalf and insert could be maintained independently—conventional demolding practices assist part removal by running one moldhalf colder than the other throughout the whole cycle just so one side of the molded part shrinks more than the other by the time the mold is opened to eject the part. Similarly, return lines 8 allow the cyclic heat transfer fluid to exit both mold cavity inserts and mold halves.

Looking at the fluid control unit (2), on the left hand side of the center line we see the "hot side" (which is activated during the heating phase of each injection molding cycle), including a heat transfer fluid reservoir (22) being maintained at a higher fluid temperature than a maximum surface temperature of the mold inserts, plumbed with an outlet line which passes through a pump (20) in turn plumbed with 3 valves:

1. A check valve (17) to prevent backflow from the supply line (7) which feeds into the injection mold (1).
2. A control valve (18) operating under electronic control of the process control unit (3) through control wire (50). When control valve (18) is in its closed position (as shown here, during the heating phase of the molding cycle), then the pumped fluid is forced to feed the mold and is prevented from returning to the reservoir, but when the control valve is opened (not shown here, during the cooling phase of the molding cycle), the "hot side" heat transfer fluid seeking the path of least resistance will dump into the "hot side" reservoir (22), and the supply line (7) feeding into the mold will become pressurized by pump (30) by "cold side" heat transfer fluid supplied from "hot side" reservoir (32).

3. Relief valve (19) will only open when high pressure in the supply line is reached which exceeds the preset value for the relief valve, thereby dumping heat transfer fluid back into the heated reservoir.

The reservoir is heated by means of heating element (21), which operates under the electronic control of the process control unit through wire (3) through wire (50) (note temperature sensor (25) connected by control wire (50) to process control unit (3).)

Turning now to the right hand side of the fluid control unit (2), we view the "cold side" of the system (which is activated during the cooling phase of each injection molding cycle), including reservoir (32) storing heat transfer fluid maintained at a lower fluid temperature than a minimum surface temperature of the mold inserts (note temperature sensor (35) connected by control wire (50) to process control unit (3). In addition to heating element (31), a heat exchanger (36) is operated under the control valve (37), to either increase, reduce, or eliminate entirely cooling water flow which acts to bring down the fluid temperature within reservoir (32), under the control of process control unit (3) through cooling water supply line (49).

In operation, during the cooling phase of the molding cycle, pump (30) feeds heat transfer fluid through check valve (27) into supply lines (7). As shown in FIG. 1, the mold is in the heating phase and not in the cooling phase, therefore control valve (28) is shown in the open position, wherein the heat transfer fluid is diverted away from supply line (7) and is dumped back into the reservoir. Similarly, as similar to the case with the hot side, control valve (28) is wired by control wire (50) into the process control unit, as is also the fluid return line with temperature sensor (33) (23 for the hot side). When control valve (34) is shown in the closed position, return line (8) feeds heat transfer fluid coming from the mold into the hot side through its control valve (24) (shown in the open position) and not into the cold side, since control valve (34) is shown in its closed position. Control valves (24) and (34) are wired by control wire (50) to the process control unit (3), and work in opposition to each other.

Look now at process control (3), shown with typical value settings characteristic of the heating phase of the molding cycle. Indicator light (41) is shown lit up, which means that heating is going on at this time (similarly, indicator light (45) is shown not lit up, which means that cooling is not being done at this time). Temperature sensor (25) provides the heat transfer fluid temperature within the hot side reservoir, and similarly temperature sensor (35) provides the heat transfer fluid temperature within the cold side reservoir (32). Settable temperature (38) for the fluid in the hot side reservoir (22) is shown, in this example, at 430 degrees F. Actual mold surface temperature (displayed as (47)) is read by cavity insert temperature sensor (10), and compared against a settable "minimum temperature" value (39) (at least=Tg or Tm for the thermoplastic), and the control logic requires that at least this minimal value be read by the temperature sensor (10) before injection is allowed to start. In this example of a polycarbonate optical disk with Tg=296 F., the settable mold surface temperature reading from sensor (10) must be at least 380 degrees before start of injection is allowed.

Cavity insert temperature sensor (10) could be any conventional thermocouple (Type J, Type K, etc) but is preferably a faster-responding (0.001 second or less) thermister. Sensor (10) should be mounted within the mold cavity insert in a position very close to the part-forming surfaces to be wetted by the molten polymer (about 0.100" or 2.5 mm setback distance is recommended). Sensor mounting can be any of the following; surface mounting, bayonet lock, magnetic probe; removable or permanent.

Settable transfer temperature (40) is shown here at 330 degrees F. When the heat transfer fluid temperatures sensed by sensor (23) in the return line feeding hot side reservoir (22) falls below this set point (in this example, 330 degrees F.), then the process control unit (3) sends a signal through control wire (50) to flow return control valve (24) to close, and valve (34) is opened to divert the return flow of heat transfer fluid into cold side reservoir (32).

Holding temperature settable time value (48) shows the time from the "mold-closed" signal from sensor (12) ("time=0") before the heating phase is ended (by opening control valve (18)). In this example, the setting value shown is eight seconds. That means that for eight second after start of injection, control valve (18) is closed and thus, after the timer exceeds this settable time delay value, then control valve (18) opens and bypasses heat transfer fluid away from supply line (7) back into hot side reservoir (22), thus bypassing the mold. Actual mold cavity temperature sensed by sensor (10) is displayed in temperature reading (47) (in this example, shown at 380 degrees F.).

Depending upon actual choice of mold materials and temperature differentials, this starting point ("time=0") can be retarded (i.e. a settable delay time AFTER "mold-closed" signal from sensor (12)) or advanced (i.e. start timer at start of "clamp decompression" or "start of mold opening" or off a robotic part-verification "mold-clear" signal, all of which start BEFORE "mold-closed" signal from sensor (12)). It would be an obvious functional equivalent to use one of these alternative means for triggering start of the "heat-on" and or "timer-start-for-transfer" instead of this preferred embodiment.

Looking now at the right hand or cold side of the process control unit, reservoir temperature settable value (42) shows the desired reservoir temperature (in this example 150 degrees F.). When the sensor (35) is reading higher temperatures than temperature setting (42), then the process control unit increases the flow rate through heat exchanger valve (37) to increase the rate of heat removal out of reservoir (32).

Cooling mold temperature value (43) can be set for determining when to open the mold and eject the part, at a point where (47) is sufficiently below Tg for the plastic's temperature (not easily directly measured) to be shape stable; shown here in this polycarbonate optical disk example at 200 degrees F. Importantly, this is substantially lower than the "control band" range of mold & coolant temperatures desired in conventional optical disk molding, which chooses a mold & coolant temperature between 240-265 F., and once set, the conventional optical disk molding process attempts to maintain this set value + or −5 degrees F. throughout the whole molding cycle, wherein typically best optical disk properties are obtained by these conventional processes and apparatus employing only one fluid reservoir operating at only one temperature setpoint throughout each molding cycle.

Settable temperature value for onset of transfer from return line (8) fluid back to reservoir for the temperature sensor (33) shows a value of 280 degrees F. When this value is exceeded, control valve (34) is closed and will not permit returning fluid to enter.

In actual operation being shown, the molded thermoplastic part has been removed from the open mold and the injection molding machine has just closed the two mold halves together to seal the parting line (16), which is confirmed by limit switch (12), which then signals process control unit (3) that a new injection molding cycle may now start. In practice, if and only if actual mold surface temperature (47) is at least equal to the settable value (39) for start of injection (in this case, both (47) and (39) equal at least 380 degrees F.), then molten thermoplastic is injected through sprue (14) into mold cavity (13).

Figure 2A:
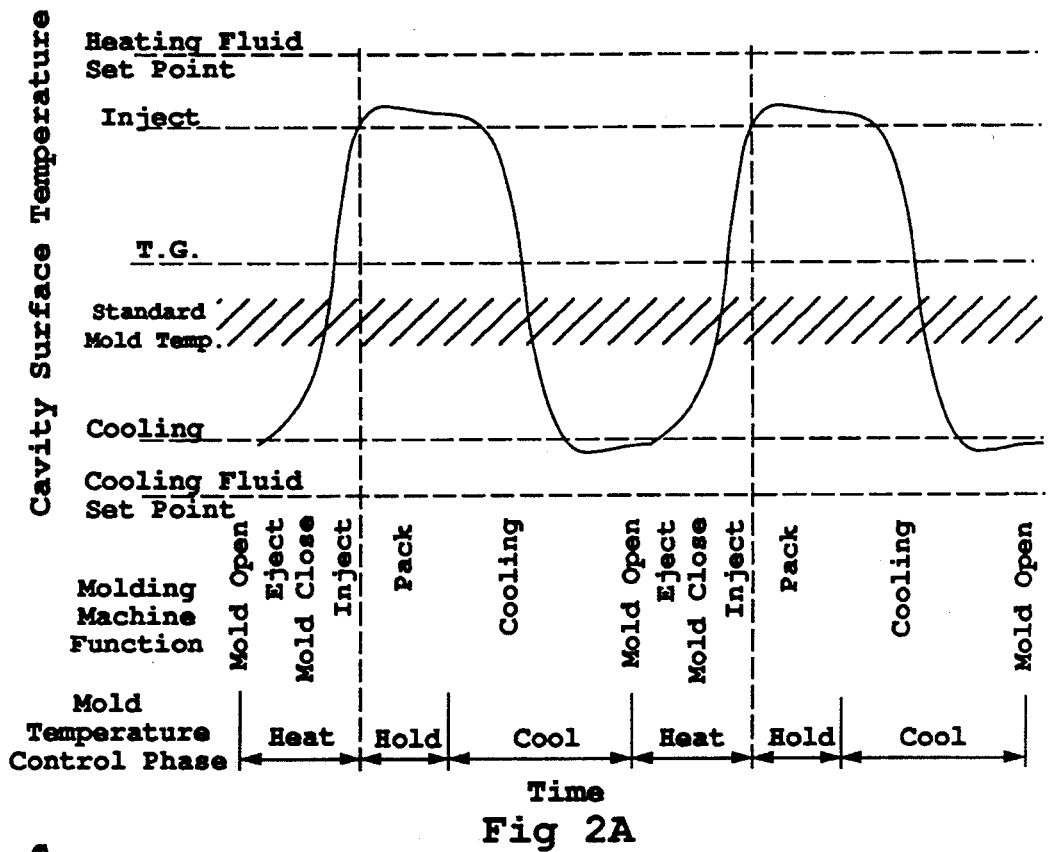
FIG. 2A shows the changing mold cavity surface temperature as a function of changing molding process sequence of the present invention.

Refer now to FIG. 2A. It shows that as the mold is opened and the molded article is ejected, the limit switch (12) signalling mold opening can be used to trigger start of heating phase, while the molded part is being ejected and the mold is again closing. (Even before actual mold opening motion trips the limit switch, it may be desirable to start heating phase BEFORE clamp decompression is started). As mold surface temperature rises up to the required minimum setpoint, heating continues, then once the desired setpoint is reached, injection can start. Sometime after the injection is ended and packing has commenced, the mold surface temperature may be allowed to fall without reducing the surface replication and quality of the molded plastic part.

In actual practice, because of the delay time, it is possible that hot side fluid pumping may be stopped at or before the start of injection even, due to this induction time or delay time effect. What counts, of course, is the mold cavity surface temperature which is seen by the plastic; as long as it remains sufficiently high so that the polymer molecules are not prematurely set in place near the mold surfaces, then high fidelity replication can occur. As shown in FIG. 2A, the settable value for start of injection is substantially above Tg and is preferable maintained there sufficiently long to assure peak cavity melt pressures have at least been attained before mold surface temperature is allowed to drop quickly by means of onset of pumping cold side heat transfer fluids. Once active cooling is started, the mold surface temperature drops quite quickly, due to high conductivity materials and thermal isolation away from the thermal-cycling mold cavity inserts, and good proximity of the flowing coolant to the molding surfaces wetted by the molten plastic polymer.

Figure 2B:
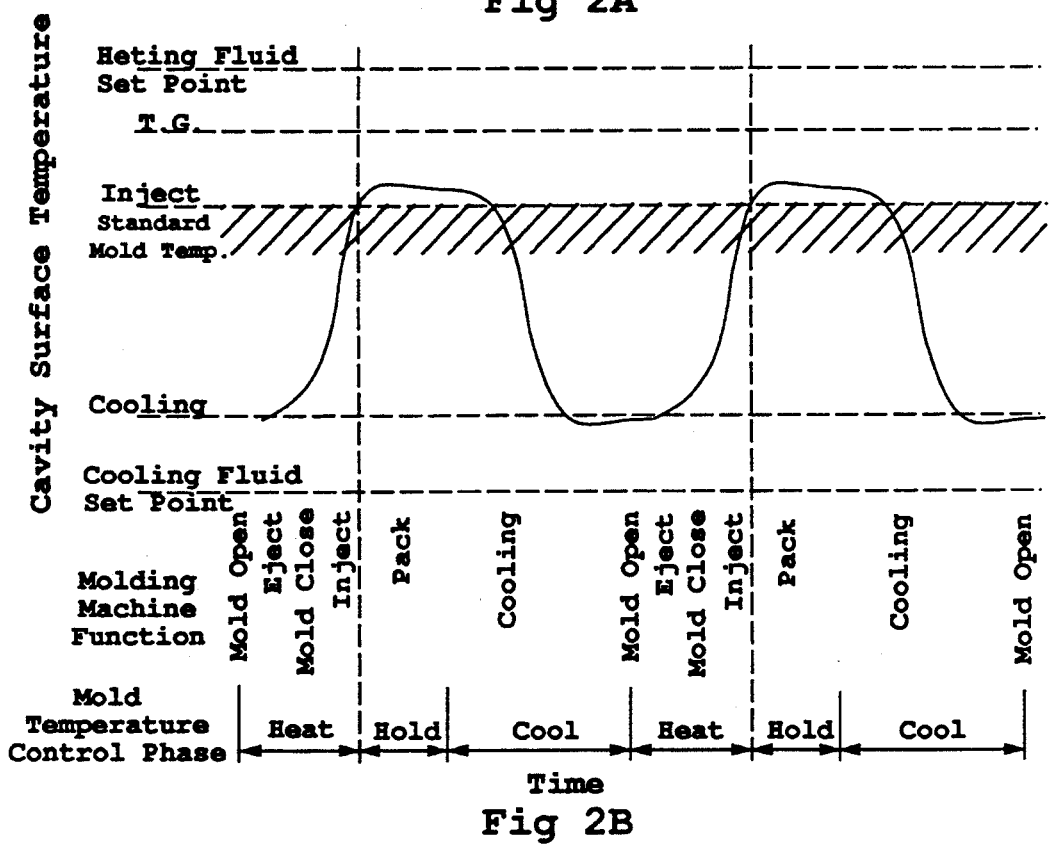
FIG. 2B shows an alternative embodiment, of a "forced cooling" process, wherein the changing mold cavity surface temperature NEVER is allowed to reach the Tg or Tm of the plastic, yet varies greatly as a function of changing molding process sequence.

See now FIG. 2B. All the above apparatus of FIG. 1 can also be employed in an alternative process embodiment, of a "forced cooling" process, wherein the changing mold cavity surface temperature NEVER is allowed to reach the Tg or Tm of the plastic, yet varies greatly as a function of changing molding process sequence. This "forced cooling" is advantageous when the cooling time is a very large % of total molding cycle time, as is the case in thick moldings. For example, in molding polycarbonate ophthalmic lens, it is common for cross sectional wall thickness to be 8-12 mm (0.320-0.480 inches), which can take 2-5 minutes to cool, at 120-145 C. (248-293 F.) conventional "isothermal" mold coolant inlet temperatures held constant throughout the molding cycle. Faster cooling rates can be forced by dropping drastically (i.e. by at least 50 C.) this mold coolant inlet temperature AFTER melt filling of the mold cavity has taken place. This differs from the preferred embodiment of the present invention in that the "hot" phase of each individual injection molding cycle never is as high in mold surface temperature as the melt solidification temperature of the thermoplastic, and that the "hot side" reservoir fluid temperature is also always below the melt solidification temperature of the thermoplastic. These alternative process embodiment steps do drive fast cooling by having a "cold side" reservoir fluid temperature greatly below (at least 50 C.; more preferably, about 100 C.) that of the "hot side" reservoir fluid temperature. This transfer from "hot" to "cold" can use the same means as the preferred embodiment of the present invention to establish an unconventionally very large "delta T" between the molten thermoplastic within the already-filled mold cavity and the circulating heat transfer fluid supplied from the "cold side" fluid reservoir, thereby setting up a greater-than-conventional thermal driving force (i.e. "forced cooling" process), using similar process transfer steps of FIG. 1 and logic flowsheet of FIG. 3 into a process sequence of FIG. 2B.

Figure 2C:
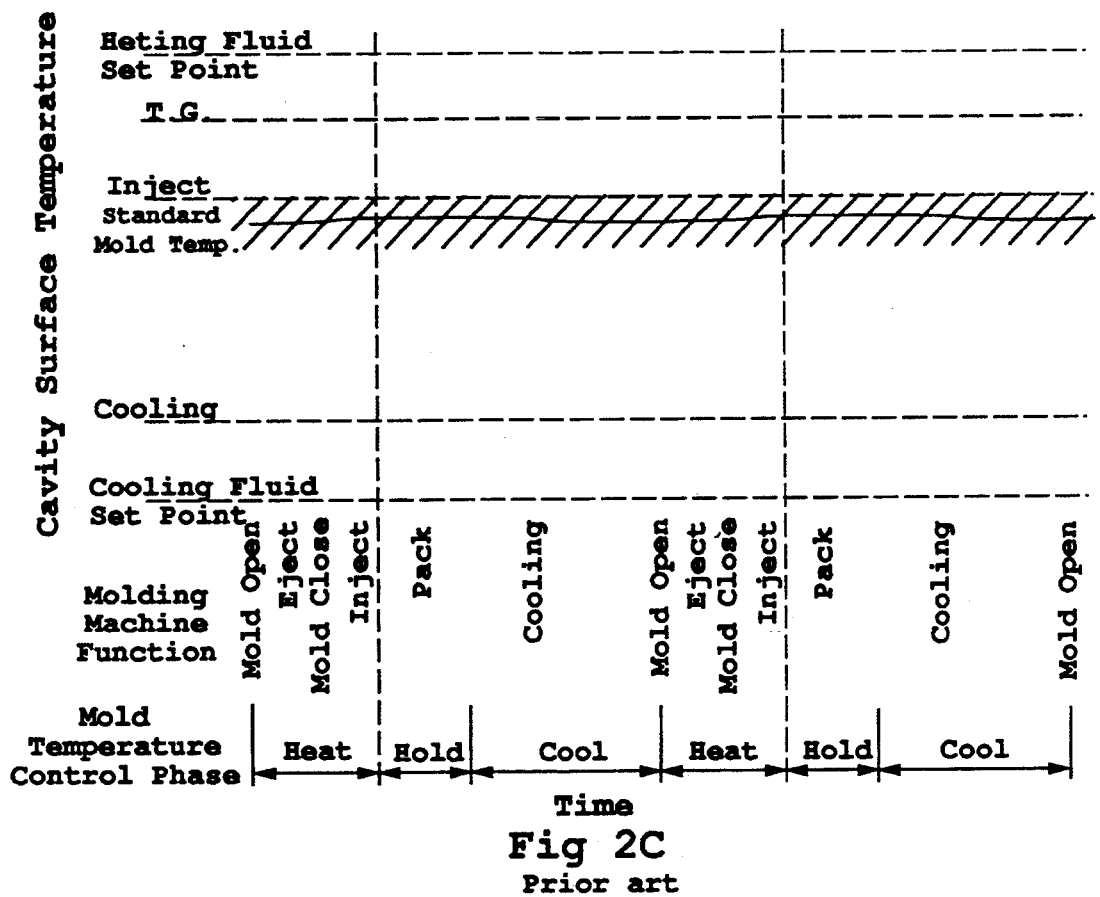
FIG. 2C shows a "prior art" embodiment, of a "conventional cooling" process, wherein by intentions the inlet fluid temperature into the mold cavity is maintained within a tight range of temperature, with minimum change within each molding cycle being desired.

In contrast to FIG. 2A, FIG. 2C shows a conventional "prior art" process sequence diagram note that actual cavity surface temperature never reaches Tg or Tm and flucuates between a lower temperature during cooling phase and a warmer temperature when the mold is being heated by the hot plastic. The important thing to note is that the transfer fluid temperature is deliberately maintained substantially constant throughout each injection molding cycle individually. This of course is in contrast to the present invention, which exceeds the Tg temperature at the time when injection is to start, then switches over to a much lower temperature heat transfer fluid during the actively cooling stages.

Figure 3:
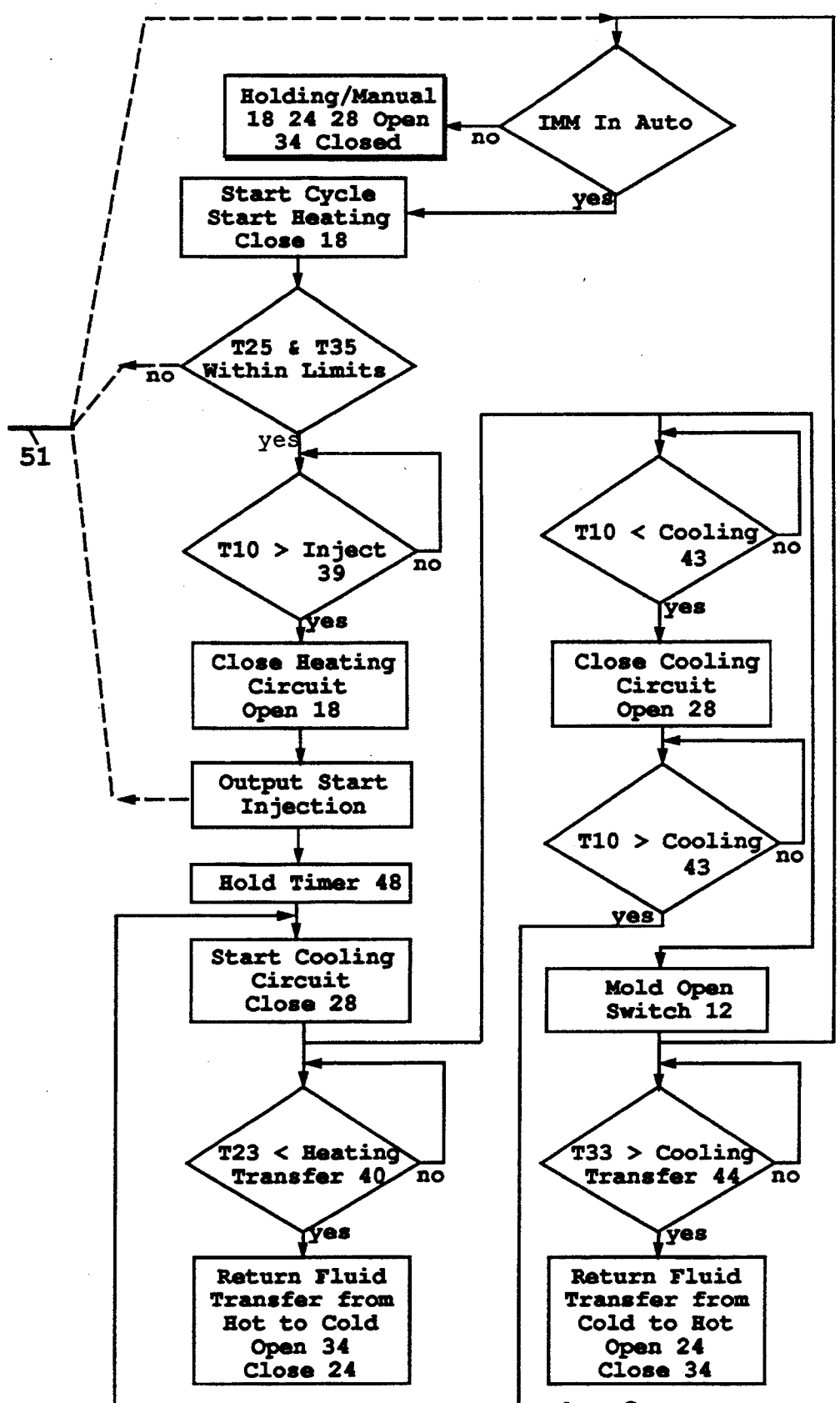
FIG. 3 shows the process flow sheet with the decision tree logic necessary for the process control device to operate.

Now see FIG. 3, which shows the process flow sheet. First, when in "standby" (non-production), the injection molding machine is in "manual mode", with valves (18), (24) and (28) open and (34) closed. To transfer into production, the injection molding machine is switched over to "automatic cycle", as shown at the top of the page. The heating cycle is started at least as soon as the mold is opened (as sensed by limit switch sensor (12)), and heating is started by closing control valve (18). Once temperatures (25) and temperatures (35) are within the set limits, and the actual mold surface temperature (T10) at least equals if not exceeds the settable value (39) inject, then injection is permitted to start. If not, then heating continues until the setpoints are reached (it is possible to add a timer which would sound an audible alarm if an abnormally long time interval has passed due to some malfunction). The next step is to close the heating circuit opening control valve (18), to stop flow from the "hotside" reservoir into the mold through supply lines (7). This is done as soon as injection has started, or could alternatively be delayed by some predetermined way. (In this preferred embodiment shown in FIG. 3 the heating circuit is essentially closed simultaneously to the start of injection, in order to minimize total cycle time, but a longer heating phase could be run without harm to quality of the molded plastic, if one is willing to reduce output quantity with this longer total molding cycle time.) At typically the same time, the hold timer (48) is started and after that settable value for time is attained, then start of the cooling phase is initiated by closing valve (28). Note that FIG. 3 shows these steps in a sequential, serial order, but it would be obvious to those skilled in the art to minimize cycle time by performing concurrently (i.e. in parallel) those steps which are not specifically contingent upon an outcome or measurement preceeding it.

Transfer of heat transfer fluid from the return line (8) depends on whether sensed temperature from sensor (23) reads less than the heating transfer temperature value (40). If not, then cooling is continued as before. If so, then the return heat transfer fluid is diverted from the hot to the cold side reservoir by opening control (34) and closing control valve (24). Next, if the actual mold surface temperature T10 is less than the prescribed value for cooling setpoint (43), then move ahead to close the cooling circuit by opening control valve (28). If T10 is less than cooling setpoint (43), then continue through previous step. When T10 is greater than cooling setpoint (43), then go back to start the cooling circuit by closing valve (28) again. When that happens, in parallel to it, the mold is opened as sensed by limit switch (12), then the next step starts. Recycle loop checks to see that the injection molding machine is still in automatic mode, then closes valve (18) to start heating again. Only when sensed temperature from sensor (33) is greater than the settable value for cooling transfer (44), then the heat transfer fluid from return line (8) is diverted away from the cold side reservoir (32) and over to hot side reservoir (22) by opening control valve (24) and closing control valve (34).

In case there is imbalance in the total flows out of and into each reservoir, there is an interconnect line (26) between reservoirs (22) and (32), such that if the liquid level of either reservoir rises to that point, than gravity transfer will spill over the excess heat transfer fluid from into the other. Note that both reservoirs are maintained at atmospheric pressure. This simple self-equilibrating, self-adjusting fluid-level-balancing apparatus could be replaced by standalone electronic level controls in fluid communication with optional auxillary 3rd ("mixed hot+cold" reservoir) and/or 3rd+4th fluid reservoirs (i.e. separate backup hotside and coldside reservoirs). Also, substitution of a 3-way valve for the combination of control valves 24+34, governing the return of fluid to the reservoirs. Return lines exiting the mold could optionally deliver the returning heat transfer fluid into a third reservoir which in turn is maintained in fluid communication with both hot side heating reservoir and cold side cooling reservoir. These examples show how the present invention should not be limited to just this hardware as illustrated in FIG. 1.

For optical thermoplastics such as polycarbonate, which has a glass transition temperature Tg of nearly 300 degrees F., because the transfer fluid system is not pressurized, it is not possible to use water as the heat transfer fluid, even though water is a heat transfer fluid is excellent (extremely low cost, very high heat transfer coefficient, minimal viscosity or resistence to flow and pumping). Therefore, hydrocarbon based oils are traditionally used for these elevated temperatures. However, in a preferred embodiment, special synthetic heat transfer fluids (such as polyalkylene glycol chemical compositions) having higher heat transfer coefficients than oil can be used up to 450 degrees F., and are preferred for use with polycarbonate resin. For lower glass transition temperature resins, such as PMMA acrylic, water may be used and would be therefore preferred.

We claim:

1. A method for injection molding thermoplastic articles within an injection mold having at least one mold cavity formed between opposing inserts made from high thermal conductivity material having at least 50,000 compressive yield strength, said inserts being maintained in thermal conductive contact with a heat transfer fluid circulating within channels entering to and exiting from the injection mold by means of supply lines and return lines plumbed to a fluid control unit having at least two heat transfer fluid reservoirs being heated or cooled under control of an electronic process control unit, at least one hot side reservoir being maintained at a higher fluid temperature than a maximum surface temperature of said inserts, and at least one cold side reservoir being maintained at a lower fluid temperature than a minimum surface temperature of said inserts, said minimum surface temperature being less than a temperature at which the thermoplastic is a form-stable solid, comprising the steps of:
   a. substantially uniformly heating opposing part-forming surfaces of said inserts by said fluid circulating from said hot side reservoir and maintaining open a return line to said hot side reservoir at least until injection is completed and until an actual mold temperature as measured by a temperature sensor mounted within said inserts reads at least a setpoint temperature chosen to retard solidification rate of said thermoplastic, such that said actual mold temperature as measured by a temperature sensor mounted within said inserts is always substantially less than said hot side reservoir circulating fluid temperature;
   b. injecting molten thermoplastic into the mold cavity formed within the injection mold, while said actual mold temperature is at least equal to said setpoint temperature chosen to retard solidification at least until the mold cavity has been completely filled with said molten thermoplastic, and maintaining open a return line to said hot side reservoir at least until injection is completed;
   c. transferring from a heating phase to a cooling phase by stopping flow of heat transfer fluid from the hot side reservoir and starting flow of heat transfer fluid supplied from the cold side reservoir;
   d. substantially uniformly cooling the mold until said actual mold temperature is below the temperature at which the thermoplastic is a form-stable solid, and said actual mold temperature as measured by a temperature sensor mounted within said inserts being always substantially greater than said cold side reservoir circulating fluid temperature;
   e. opening the mold along a parting line and removing the molded thermoplastic product and transferring from a cooling phase to a heating phase by stopping flow of heating transfer fluid from the cold side reservoir and starting flow from the hot side reservoir, in preparation of the start of the next injection molding cycle.

2. A method of claim 1, wherein said thermoplastic is amorphous, said setpoint chosen to retard solidification rate is at least equal to a glass transition temperature of said thermoplastic, and said temperature at which the thermoplastic is a form-stable solid is the glass transition temperature of said amorphous thermoplastic.

3. A method of claim 1, wherein said thermoplastic is amorphous, said setpoint chosen to retard solidification rate is at least 10 degrees C. below a glass transition temperature of said thermoplastic, and said temperature at which the thermoplastic is a form-stable solid is the glass transition temperature of said amorphous thermoplastic.

4. A method of claim 1, wherein said thermoplastic is substantially crystalline, said setpoint chosen to retard solidification rate is at least equal to a melting point temperature of said thermoplastic, and said temperature at which the thermoplastic is a form-stable solid is the melting point temperature of said substantially crystalline thermoplastic.

5. A method of claim 1, wherein said actual mold temperature is at least equal to said setpoint chosen to retard solidification rate, until the mold cavity has been completely filled with said molten thermoplastic and is also further pressurized to a desired level of melt pressure within said mold cavity.

6. A method of claim 1, wherein the heat transfer fluid temperature supplied by the hot side reservoir is at least 10 degrees centigrade higher than the glass transition temperature or melting point temperature of the thermoplastic, and the heat transfer fluid temperature supplied by the cold side reservoir is at least 10 degrees centigrade below the glass transition temperature or melting point temperature of the thermoplastic.

7. A method of claim 6, wherein said heat transfer fluid temperatures are at least 25 degrees C. different from the glass transition temperature or melting point temperature of the thermoplastic.

8. A method for injection molding thermoplastic articles within an injection mold having at least one mold cavity formed between opposing inserts made from high thermal conductivity material having at least 50,000 compressive yield strength, said inserts being maintained in thermal conductive contact with a heat transfer fluid circulating within channels entering to and exiting from the injection mold by means of supply lines and return lines plumbed to a fluid control unit having at least two heat transfer fluid reservoirs being heated or cooled under control of an electronic process control unit, at least one hot side reservoir being maintained at a higher fluid temperature than a maximum surface temperature of said inserts, and at least one cold side reservoir being maintained at a lower fluid temperature than a minimum surface temperature of said inserts, said minimum surface temperature being less than a temperature at which the thermoplastic is a form-stable solid, comprising the steps of:

a. substantially uniformly heating opposing part-forming surfaces of said inserts by said fluid circulating from said hot side reservoir and maintaining open a return line to said hot side reservoir at least until injection is completed, until an actual mold temperature as measured by a temperature sensor mounted within said inserts reads at least a setpoint temperature chosen to retard solidification rate of said thermoplastic, said thermoplastic being amorphous, said setpoint chosen to retard solidification rate is at least equal to a glass transition temperature of said thermoplastic, and said temperature at which the thermoplastic is a form-stable solid is the glass transition temperature of said amorphous thermoplastic, and said heat transfer fluid temperature supplied by the hot side reservoir is at least 25 degrees centigrade higher than the glass transition temperature of the thermoplastic, such that said actual mold temperature as measured by a temperature sensor mounted within said inserts is always substantially less than said hot side reservoir circulating fluid temperature;

b. injecting molten thermoplastic into the mold cavity formed within the injection mold, while said actual mold temperature is at least equal to said setpoint temperature chosen to retard solidification at least until the mold cavity has been completely filled with said molten thermoplastic and is also further pressurized to a desired level of melt pressure within said mold cavity;

c. transferring from a heating phase to a cooling phase by stopping flow of heat transfer fluid from the hot side reservoir and starting flow of heat transfer fluid supplied from the cold side reservoir, said heat transfer fluid temperature supplied from the cold side reservoir being at least 25 degrees centigrade below the glass transition temperature of the thermoplastic;

d. substantially uniformly cooling opposing part-forming surfaces of said inserts by said heat transfer fluid circulating from said cold side reservoir until said actual mold temperature is below the temperature at which the thermoplastic is a form-stable solid, and said actual mold temperature as measured by a temperature sensor mounted within said inserts being always substantially greater than said cold side reservoir circulating fluid temperature;

e. opening the mold along a parting line and removing the molded thermoplastic product and transferring from a cooling phase to a heating phase by stopping flow of heat transfer fluid from the cold side reservoir and starting flow from the hot side reservoir, in preparation of the start of the next injection molding cycle.

9. An apparatus for injection molding thermoplastic articles, comprising:

a. an injection mold having at least one mold cavity formed between opposing inserts, at least one temperature sensor mounted within said inserts, said inserts being fabricated from materials having at least 50,000 psi compressive yield strength so as to resist deformation by injection molding pressures, said material being selected from low alloy tool steels or copper alloys or aluminum alloys, said inserts each being maintained in thermal conductive contact with a heat transfer fluid circulating within a channel entering to and exiting from the injection mold by a supply line and a return line;

b. a fluid control unit having at least two heat transfer fluid reservoirs in fluid communication with the injection mold by said supply lines and return lines, control valve means for opening or closing said supply line and return line under control of an electronic process control unit, with at least one hot side reservoir being maintained at a higher fluid temperature than a maximum surface temperature of said inserts, and at least one cold side reservoir being maintained at a lower fluid temperature than a minimum surface temperature of said inserts, said inserts being substantially uniformly heated or cooled with minimal point-to-point temperature differences;

c. the electronic process control unit capable of receiving temperature readings from said at least one temperature sensor mounted within at least one of said inserts and from any temperature sensors provided within said supply lines and return lines and said reservoirs, and said heat transfer fluid reservoirs being capable of being heated under control of said electronic process control unit, such that said process control unit can open and close control valves governing flow of heat transfer fluid within said supply line and said return lines maintained in fluid communication between said fluid control unit and said injection mold, and at least until injection is completed said hot side return line being maintained open, according to a sequence based upon comparison of said temperature readings from said temperature sensor mounted within at least one of said inserts against a series of settable temperatures and related time values, thereby determining the start and stop of a heating phase and a cooling phase within each individual injection molding cycle.

10. An apparatus of claim 9, wherein said insert is fabricated of a high thermal conductivity copper-based alloy having at least 80,000 psi compressive yield strength and fitted with flow channels suitable for circulating heat transfer fluid.

11. An apparatus of claim 10, wherein at least one of a pair of opposing part forming surfaces of said inserts is coated with a harder material than the high thermal conductivity alloy.

12. An apparatus of claim 11, wherein at least one of a pair of opposing part forming surfaces of said inserts is optically polished on a part forming surface.

13. An apparatus of claim 9, wherein said high conductivity insert is made of a monolithic single piece of high conductivity metal further comprising:
  a. a electoplated nickel or chromium face which is hardened and optically polished joined intimately to a substrate,
  b. said substrate being made from a very high conductivity copper alloy having a compressive yield strength of at least 50,000 PSI.

14. An apparatus of claim 9, wherein an electroformed nickel stamper is mounted against at least one of an optically polished mold insert surface in order to provide precision surface detail.

15. A method of claim 8, wherein the thermoplastic molded product is an information bearing optical data storage disk or holographic optical disk.

16. A method of claim 8, wherein the thermoplastic molded product is an optical instrument lens or vision-corrective eyewear ophthalmic spectacle lens or precision optical mirror.

17. A method of claim 8, wherein the thermoplastic is optical grade polycarbonate and a synthetic heat transfer fluid is employed capable of being heated at least 50 degrees above its Tg without being pressurized.

* * * * *